Figure 1:
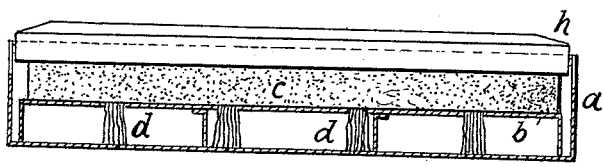

No. 622,654. Patented Apr. 4, 1899.
C. KANITZ.
APPARATUS FOR DAMPING ENVELOPS OR THE LIKE.
(Application filed Dec. 13, 1898.)
(No Model.) 2 Sheets—Sheet 1.

WITNESSES:
F. W. Wright
S. C. Connor

INVENTOR
CONRAD KANITZ
BY Howsman and Howsman
HIS ATTORNEYS

No. 622,654. Patented Apr. 4, 1899.
C. KANITZ.
APPARATUS FOR DAMPING ENVELOPS OR THE LIKE.
(Application filed Dec. 13, 1898.)
(No Model.) 2 Sheets—Sheet 2.

WITNESSES:
F. W. Wright
S. C. Connor

INVENTOR
CONRAD KANITZ.
BY Howson and Howson
HIS ATTORNEYS.

UNITED STATES PATENT OFFICE.

CONRAD KANITZ, OF MELKOF, GERMANY.

APPARATUS FOR DAMPING ENVELOPS OR THE LIKE.

SPECIFICATION forming part of Letters Patent No. 622,654, dated April 4, 1899.

Application filed December 13, 1898. Serial No. 699,152. (No model.)

*To all whom it may concern:*

Be it known that I, CONRAD KANITZ, a subject of the German Emperor, residing at Melkof, Mecklenburg, in the German Empire, have invented certain new and useful Improvements in Apparatus for Damping Envelops or the Like; and I do hereby declare the following to be a full, clear, and exact description of the invention, such as will enable others skilled in the art to which it appertains to make and use the same.

This invention relates to apparatus for damping envelops and the like.

Apparatus for damping envelops and the like as heretofore made and wherein the envelop to be moistened is applied to a moistening or damping cushion which is either of the shape of the part to be damped or has its moistening-surface made to correspond with the surface to be damped by a pattern-plate or the like fitted thereto, the said envelop being then pressed against the moistening-cushion by moving down a cover or a pressure-plate, possess disadvantages which almost exclude them from practical use, such disadvantages being that the cover which when pressed downward always comes into contact with the moistening-surface becomes wet upon the pressure-surface and when next brought into operation moistens or soils the outside of the envelop or the like which is placed in the apparatus. As this is the part of the envelop with which the fingers are brought into contact for gumming down the flap, it is almost impossible to prevent the soiling of the said flap, so that the envelop acquires a dirty appearance. Now this disadvantage is obviated by the apparatus forming the subject of this invention by providing the pressure-surface of the cover with a layer of a material which takes up or absorbs water, but which does not give it up when next used, so that it is not possible for the outside of the envelop to be wetted by the cover to any injurious extent.

I have found in practice that a suitable material from which to make the absorbent layer comprises a small-meshed fabric—such, for example, as wire-gauze—and I therefore provide the cover of my apparatus upon the pressure-surface with a covering of wire-gauze. This action of the wire-gauze can be explained by saying that on account of the rounded portions of the pressure-surface, presented in contact with the cushion and envelop, any moisture which may be transferred from the damping-cushion to the said gauze does not spread laterally, but upward. In the drawings there is shown as an example a damping apparatus provided with this arrangement, the apparatus chosen being of the kind wherein the extent of the moistening-surface is confined by a suitable pattern-plate or the like which is applied to the moistening or damping cushion.

Figure 2:
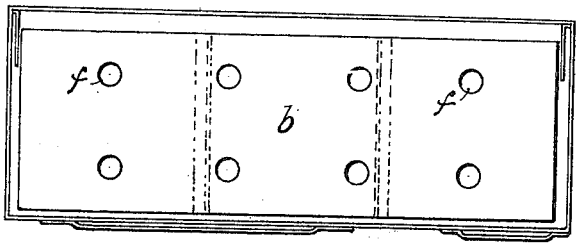
Figure 3:
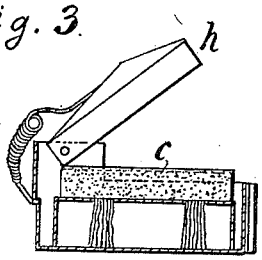
Figure 4:
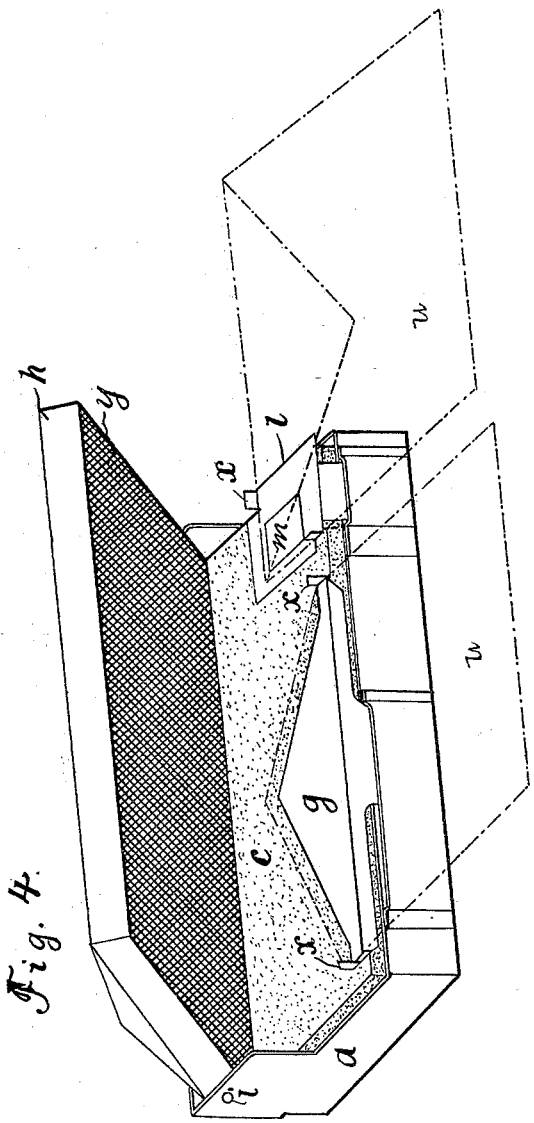

In the said drawings, Figures 1 and 3 show the apparatus in vertical section. Fig. 2 is a plan with the cover removed, and Fig. 4 is a perspective view of the apparatus.

The apparatus which is chosen as an example consists of the box or case $a$, which also serves as the water-container and in which is fitted a device in the form of a plate $b$, provided with perforations $f$, the said plate resting upon feet or projections on the sides of the case $a$. Upon this flat plate there lies a sheet $c$, of porous absorbent material, preferably a sheet of felt, the said sheet being at such a height above the bottom of the box $a$ that it, together with its support $b$, lies above the surface of the water in the said box $a$. The sheet $c$ is fed with water from the reservoir $a$ by means of suction-filaments or the like $d$, which dip into the water. Furthermore, the superfluous water can always flow away through the openings $f$ in the plate $b$. The envelops or the like to be moistened or damped are placed upon the damping-sheet $c$.

The extent or shape of the damping-surface is limited by a pattern-plate or the like $g$, which lies upon the damping-sheet $c$ and is suitably secured to the case of the apparatus, the said pattern having a shape corresponding to that of the envelop-flap and being provided with projections or stops $x$ to enable the envelop to be placed exactly in position. The envelop $u$ is laid upon the pattern-plate $g$ in such a manner that the gummed portion, as shown in dotted lines in Fig. 4, projects over the edge of the pattern-plate. The projecting portion of the flap is then pressed upon the damping-sheet $c$ by means of the cover $h$ of the apparatus, which for this purpose is preferably fitted to hinges $i$ and is normally returned to its open position by means of springs, so that the apparatus is always ready for use.

The cover $h$, which serves as the pressure-plate, is provided upon its pressure-surface with wire-gauze $y$ or with a similarly-acting fabric or gauze which does not deposit moisture which may be obtained from the damping-cushion $c$ to any injurious extent upon the envelop to be damped or moistened.

To damp or moisten envelops, post-cards, &c., upon the front at the part upon which the stamp is to be applied, the pattern-plate $l$, which is shown to the right hand of Fig. 4, can be employed, the said pattern having a hole or opening $m$, which corresponds to the size of the stamp. By applying the label, envelop, &c., upon this pattern-plate, which is also provided with projections or stops $x$, a portion of the envelop or label corresponding to the size of the opening or hole $m$ is brought into contact with the damping-surface when the cover is turned down and is thereby moistened or damped.

The pattern-plates $g$ and $l$ are interchangeable, and the apparatus can always be provided with pattern-plates corresponding to the shapes of the envelops or the like to be damped or moistened.

As already mentioned, the apparatus can be made in other forms, that shown and described being only given as an example.

It will thus be seen by the foregoing description of my construction that the lateral spreading of the moisture on the gauze fabric is reduced to a minimum, and thereby moisture is prevented from being deposited upon the envelop to any injurious extent.

Having now particularly described my invention, what I claim, and desire to secure by Letters Patent, is—

1. In an apparatus for moistening envelops or the like, the combination of a box, a moistening-cushion supported therein upon which the envelop or the like is placed for moistening, a pressure-plate having a cover of wire-gauze fabric for contact with the cushion and envelop when placed thereon, whereby the lateral spreading of moisture that is taken up by the said pressure-plate from the cushion is reduced to a minimum, substantially as described.

2. In an apparatus for moistening envelops or the like, the combination of a box, a plate having perforations therein supported above the bottom of the box, a moistening-cushion supported by said plate, means for conveying water from the reservoir formed in the box below said plate to the cushion, a pressure-plate having a covering of gauze fabric presenting rounded surfaces of contact with the envelop and cushion, whereby lateral spreading of moisture taken up by the pressure-plate is reduced to a minimum, substantially as described.

3. In an apparatus for moistening envelops and the like, the combination of a box, a plate having perforations therein supported above the bottom of the box, a moistening-cushion upon which the envelops are placed for moistening supported on said plate, filaments connecting said cushion with a water-reservoir formed below the plate for supplying the water to said cushion, and a pressure-plate having a covering of wire-gauze presenting rounded surfaces of contact with the cushion and envelop, substantially as described.

4. In an apparatus for moistening envelops and the like, the combination of a box, a moistening-cushion supported above the bottom of the box, a protecting pattern-plate on said cushion over which the envelop is placed and beyond which the portion to be moistened extends in contact with the cushion, and a pressure-plate having a covering of gauze fabric presenting rounded surfaces in contact with the cushion, whereby lateral spreading of water which is taken up by the pressure-plate is reduced to a minimum, substantially as described.

In testimony whereof I affix my signature in presence of two witnesses.

CONRAD KANITZ.

Witnesses:
 E. L. GOLDSCHMIDT,
 MAX. C. STÄHLER.